United States Patent
Levi et al.

(10) Patent No.: US 9,860,568 B2
(45) Date of Patent: Jan. 2, 2018

(54) WORLD VIEW WINDOW

(71) Applicant: ATTI International Services Company, Inc., Hauppauge, NY (US)

(72) Inventors: Eli Levi, Dix Hills, NY (US); Richard Engel, Ridge, NY (US)

(73) Assignee: ATTI International Services Company, Inc., Hauppauge, NY (US)

( * ) Notice: Subject to any disclaimer, the term of this patent is extended or adjusted under 35 U.S.C. 154(b) by 0 days.

(21) Appl. No.: 15/184,217

(22) Filed: Jun. 16, 2016

(65) Prior Publication Data

US 2017/0347129 A1    Nov. 30, 2017

Related U.S. Application Data

(60) Provisional application No. 62/341,052, filed on May 24, 2016.

(51) Int. Cl.
| | |
|---|---|
| *H04N 21/218* | (2011.01) |
| *H04N 21/2187* | (2011.01) |
| *H04N 21/482* | (2011.01) |
| *H04N 21/41* | (2011.01) |
| *H04N 21/44* | (2011.01) |
| *H04N 21/422* | (2011.01) |

(52) U.S. Cl.
CPC ..... *H04N 21/2187* (2013.01); *H04N 21/4122* (2013.01); *H04N 21/42204* (2013.01); *H04N 21/44004* (2013.01); *H04N 21/482* (2013.01); *G06T 2210/04* (2013.01)

(58) Field of Classification Search
None
See application file for complete search history.

(56) References Cited

U.S. PATENT DOCUMENTS

| | | | | |
|---|---|---|---|---|
| 5,426,879 | A  * | 6/1995 | Hecker | G09F 13/08 |
| | | | | 362/812 |
| 6,628,321 | B1 * | 9/2003 | Nutaro | H04N 7/18 |
| | | | | 348/40 |
| 6,798,407 | B1 | 9/2004 | Benman | |
| 7,280,439 | B1 | 10/2007 | Shaddox | |
| 7,536,079 | B2 | 5/2009 | Barron | |
| 8,306,391 | B2 | 11/2012 | Viswambharan et al. | |
| 8,306,402 | B2 | 11/2012 | Ishihara | |
| 8,369,399 | B2 | 2/2013 | Egnal et al. | |

(Continued)

FOREIGN PATENT DOCUMENTS

EP    1244303 A2    9/2002

OTHER PUBLICATIONS https://web.archive.org/web/20150528041948/http://sonte.com/features.*

(Continued)

*Primary Examiner* — Nicholas Corbo
(74) *Attorney, Agent, or Firm* — Brian Roffe (57) ABSTRACT

Arrangement and method in which at least one server is coupled to imaging sources that obtain high resolution videos of scenic locations, a series of images constituting a video. Stream controllers are located at user sites and coupled to the server. The stream controllers are controlled, e.g., by user interfaces, to select one of the imaging sources to provide high resolution streaming video to the stream controller via the server. A display system is coupled to each stream controller and configured to display streaming video from the selected imaging source.

18 Claims, 6 Drawing Sheets

(56) References Cited

U.S. PATENT DOCUMENTS

| | | | |
|---|---|---|---|
| 8,896,608 B2 | 11/2014 | Meisingset | |
| 2007/0166671 A1* | 7/2007 | Walter | G09B 5/00 |
| | | | 434/98 |
| 2008/0088624 A1* | 4/2008 | Long | G06T 15/205 |
| | | | 345/427 |
| 2008/0109857 A1* | 5/2008 | Goodwill | H04N 7/16 |
| | | | 725/87 |
| 2010/0026901 A1 | 2/2010 | Moore et al. | |
| 2010/0192219 A1 | 7/2010 | Carvajal et al. | |
| 2010/0268359 A1* | 10/2010 | Prestenback | H04N 7/17318 |
| | | | 700/94 |
| 2012/0082427 A1 | 4/2012 | Andres et al. | |
| 2012/0262576 A1 | 10/2012 | Sechrist et al. | |
| 2014/0269222 A1 | 9/2014 | Patton et al. | |
| 2015/0071043 A1 | 3/2015 | Kubota | |
| 2015/0177704 A1 | 6/2015 | Howell | |
| 2016/0041527 A1 | 2/2016 | Patton et al. | |

OTHER PUBLICATIONS https://www.electronichouse.com/home-energy-management/3-smart-glass-solutions-replace-electronic-window-shades/.*
https://web.archive.org/web/20141216094200/http://www.glass-apps.com:80/products/smart-glass-windows/.*
International Search Report for PCT/US2017/033934 dated Sep. 11, 2017.
Written Opinion for PCT/US2017/033934 dated Sep. 11, 2017.

* cited by examiner

WORLD VIEW WINDOW

CROSS-REFERENCE TO RELATED APPLICATION

This application claims the benefit of priority under 35 U.S.C. §119(e) of U.S. provisional patent application Ser. No. 62/341,052 filed May 24, 2016, which is incorporated by reference herein.

FIELD OF THE INVENTION

The present invention relates generally to virtual reality and interior/architectural design, and arrangements and methods for providing a virtual reality environment for a user.

The present invention also relates to arrangements and methods for displaying scenic streaming video at one location and time that have been obtained from another location and/or at a different time to enable a viewer of the streaming video to transport themselves in place and/or time to another, more scenic location, thereby allowing the viewer to immerse themselves in the alternate, virtual reality of another location and/or time upon demand.

The present invention also relates to computer programs and applications that implement the arrangements and methods mentioned above.

BACKGROUND OF THE INVENTION

Residential units (apartment, condominium, townhouse, etc.) in high-rise buildings typically command higher rent or purchase price premiums for units with better 'views'. In general, the higher the floor number in such a building, the higher the premium for units on that floor due to a more desirable view. Furthermore, units that face in less desirable directions or have obstructed views are typically rented/priced lower for obvious reasons. This follows along the lines of the real estate mantra: location, location, location.

The explosive growth in display technology and IoT (Internet of Things) connectivity can now bring breathtaking scenic views that are currently typically affordable only by a select few to the masses. A world of realistic alternate outside scenic views can be accomplished using high definition (HD) or ultra-high definition (UHD) technologies and streaming feeds from a plurality of remotely located camera(s).

It is envisioned by the inventors that virtual scenic views could be incorporated as part of a new architectural design or retrofitted as part of an interior design remodeling effort.

U.S. Pat. No. 6,798,407 (Benman) describes a system and method for providing a functional virtual environment with real time extracted and transplanted images. The system provides a multi-dimensional computer-generated environment for receiving a plurality of extracted video images. The system is adapted to transplant the extracted video images into the environment to preserve the virtual metaphor thereof. The extracted images are transplanted onto an object in the environment as a texture. The extracted video images are streamed continuously into the environment such that a live real time interaction is enabled. The environment is networked and the system is adapted to receive multiple simultaneous streams which are transplanted and exported to enable a virtual community.

U.S. Pat. No. 7,536,079 (Barron) describes a method for a time shift display of a video signal wherein upon a pause command a received video signal is recorded on a recording medium, and upon a resume command the recorded video signal is provided to a display device while the received video signal is continued to be recorded. Successive pause start indicators are stored upon further pause commands, and upon further successive resume commands recorded video signal starting from the latest or a successively previous pause start indicator is provided to a display device.

U.S. Pat. No. 8,306,391 (Viswambharan, et al.) describes a method for operating a data reproduction device that enables users to resume reproduction of audio and/or video content across different devices of the same or different type. The method includes receiving first index data from a different data reproduction device wherein the first index data indicates a first position in content in a first format and the content includes at least one of audio and video data, determining a second position in the content in a second format using the first index data, and enabling reproduction of the content in the second format beginning from the second position.

U.S. Pat. No. 8,306,402 (Ishihara) describes a display device that switches a broadcast channel which is being received by a tuner unit based on a broadcast channel switching instruction input from a user operating unit and transmits broadcast channel switching information to a recording and reproduction device. The recording and reproduction device sets a channel of a tuner unit to the same channel as the display device based on the broadcast channel switching information. A content is recorded and reproduced by a recording and reproduction unit based on a time shift viewing/listening instruction, a switch unit of the display device is switched from the tuner unit to the recording and reproduction device, and the reproduction output from the recording and reproduction device is displayed on a display unit.

U.S. Pat. No. 8,896,608 (Meisingset) describes a method for providing an animation from prerecorded still pictures where the relative positions of the pictures are known. The method is based on prerecorded still pictures and location data, associated with each still picture, that indicates the projection of the subsequent still picture into the current still picture. A current still picture is provided, then the location data associated with the still picture. Then, an animation is generated based on the current still picture and the location data, and the animation presented on a display. The invention is alleged to be able to provide an experience of driving a virtual car through the photographed roads, either by an auto pilot or manually. The user may change speed, drive, pan, shift lane, turn in crossings or take u-turns anywhere. Also, the invention is said to provide a means to experience real time, interactive video-like animation from widely separated still pictures, as an alternative to video-streaming over a communication line.

OBJECTS AND SUMMARY OF THE INVENTION

An object of at least one embodiment of the present invention is to provide a projected viewing system that is capable of displaying a plurality of streamed scenic or picturesque views that may not be locally available. The streamed view(s) may be viewed in real-time or time-shifted to compensate for the time differential between the local time at which the scenic view is obtained and the local time at the viewing location such that the scenic view mimics the current conditions (such as viewing a sunrise occurring half way around the world at sunrise of local time). It is envisioned that a paid subscription service could be created by aggregating these feeds from a number of streaming camera sources that serve as various scenic channels from locations around the world.

More specifically, in one embodiment of an arrangement in accordance with the invention, at least one server is coupled to a plurality of imaging sources at selected locations that obtain preferably high resolution videos of presumably scenic or picturesque views of that location. A plurality of stream controllers are each located at a user site and coupled to the server(s). A respective user interface, e.g., at each user site, is configured to enable control of each stream controller to select one of the imaging sources to provide streaming video to that stream controller via the server. A respective display system, e.g., at the user sites, is coupled to each stream controller and configured to display streaming video from the selected imaging source.

The server may be constituted only by a single origin server that aggregates the videos from the imaging sources and a single distribution server coupled to the origin server and that distributes the streaming video to the stream controllers. Alternatively, the server may be constituted by a single origin server that aggregates the videos from the imaging sources and a plurality of distribution servers that form a content delivery network and distribute the streaming video to the stream controllers. Each distribution server may be configured to distribute the streaming video to one or more of the stream controllers.

Each display system may be a high resolution digital light projector configured to project the streaming video onto a screen of the display system. Smart glass can provide the screen of the display system. The display system may also be a high resolution panel display.

Optionally, one or more video memory components may be associated with each stream controller and configured to buffer a minimum number of hours, e.g., 24 hours, of the streaming video. Alternative buffering configurations, whether implemented in hardware and/or software, can also be provided.

Each user interface may be configured to enable control of one stream controller to determine a time differential between imaging local time at which one of the videos was obtained and local time at a geographic location of the stream controller and select one or more of the streaming videos to be retrieved by the stream controller from the server based on the determined time differential to enable display of a streaming video imaged at the imaging local time at the local time at the geographic location of the stream controller (or the display system associated therewith).

Optionally, a video memory component is associated with each stream controller and configured to store a minimum of, for example, a 24 hour loop of the streaming video. The stored loop can be provided to the display system when the stream controller is unable to communication with the server to retrieve streaming videos from the server.

The stream controller may be configured to select another one of the imaging sources to provide streaming video to the stream controller via the server when streaming from the selected imaging source is interrupted.

A remote control unit may be configured to control each stream controller using, for example, a dedicated IR/RF channel, Bluetooth® or wireless hardware. Other remote control techniques may also be applied in the invention.

A selective display method in accordance with the invention includes obtaining high resolution videos of scenic locations from imaging sources imaging the scenic locations, coupling at least one server to the imaging sources, and distributing the videos to a plurality of stream controllers each located at a user site and coupled to the at least one server. Each stream controller is controlled to select one of the imaging sources to provide streaming video to the stream controller via the server for display. The at least one server may consists of, i.e., be limited to, a single origin server that aggregates the videos from the imaging sources and a single distribution server coupled to the origin server and that distributes the streaming video to the plurality of stream controllers. No other servers are provided.

Alternatively, the at least one server may comprise, include but not be limited to, a single origin server that aggregates the videos from the imaging sources and a plurality of distribution servers that form a content delivery network and distribute the streaming video to the plurality of stream controllers.

The method optionally entails coupling at least one of the stream controllers to a digital light projector, positioning a display window in a projection path of the digital light projector, and controlling the digital light projector to display the streaming video from the selected imaging source on the display window. The display window may be integrated into a window of a residence.

Additionally or alternatively, a display panel is coupled to one of the stream controllers and the streaming video from the selected one of the imaging sources displayed on the display panel. Different users may have different display techniques, at the discretion of the user for example.

In a particularly advantageous embodiment, the method entails determining a time differential between imaging local time at which one of the videos was imaged and local time at a geographic location of one of the stream controllers (or its associated display system) using a processor and displaying the streaming video from the selected one of the imaging sources with a time delay based on the determined time differential to enable display of a streaming video imaged at the imaging local time at the local time at location of the stream controller.

Also, it is possible to store a minimum of, for example, a 24 hour loop of a high resolution video from one of the imaging sources at a video memory component associated with one of the stream controllers. The stored loop of at least one high resolution video from the imaging source is displayed when the stream controller is unable to communication with the server to retrieve high resolution videos from the server.

An exemplifying arrangement in accordance with the invention includes a plurality of imaging sources each imaging a scenic location in high resolution, at least one server each coupled to the imaging sources and receiving videos from the imaging sources, a plurality of stream controllers each located at a user site and coupled to the at least one server, and a respective user interface configured to enable control of each stream controller to select one of the imaging sources to provide streaming video to the stream controller via the server. A display screen is provided along with and at least one high resolution digital light projector located in a common housing with a respective the stream controller. Each digital light projector is configured to project the streaming video from the selected imaging source onto the display screen to cause display the streaming video from the selected imaging source.

The invention will be described in detail with reference to some preferred embodiments of the invention illustrated in the figures in the accompanying drawings. However, the invention is not confined to the illustrated and described embodiments alone.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE INVENTION

The explosive growth of video media streaming has evolved over the last decade and is expected to exceed $10 billion in combined revenue (Netflix, Amazon, Hulu, SlingTV, etc.) in 2016. The growth of video streaming technology also fosters more select niche applications.

Figure 1:
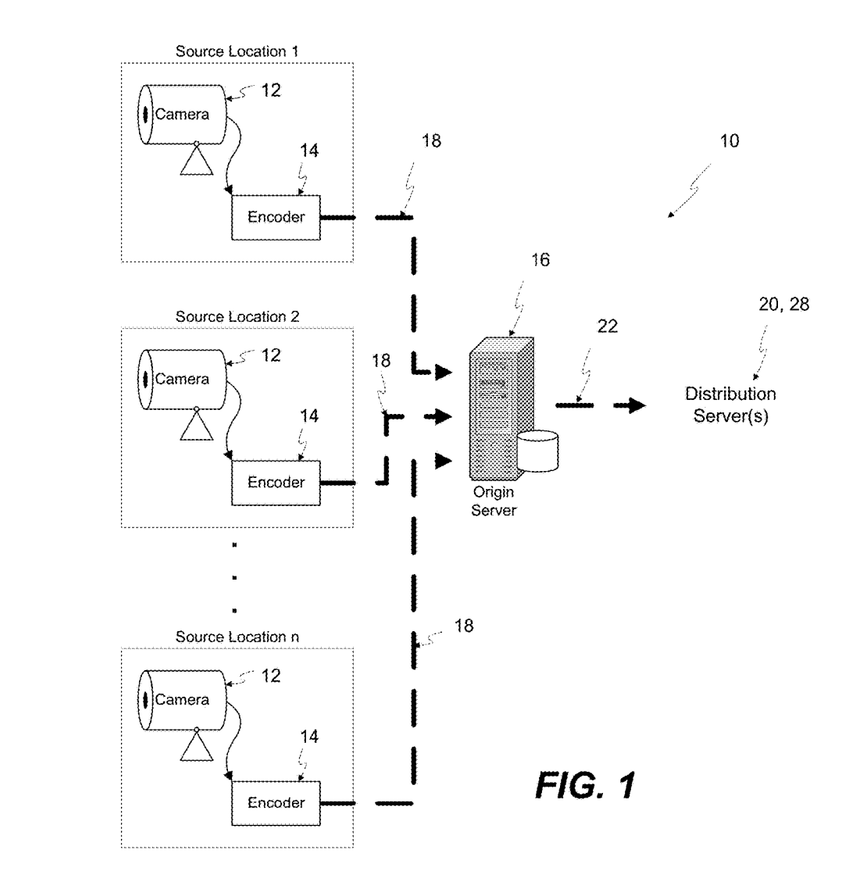
FIG. 1 shows a plurality of cameras sources distributed, for example, at different locations around the world, streaming content into an origin server.

In accordance with the invention, one such application would be an arrangement 10 that allows for the streaming of videos from a plurality of varied camera sources at scenic locations around the world on a 24 hour a day, seven day a week basis, see FIG. 1. In a preferred embodiment, location selection for camera sources would have to satisfy a number of criteria: scenic or picturesque view preferably or at least likely from a high vantage point (i.e., upper floors of a skyscraper), easy accessibility to the camera sources for maintenance purposes, availability of high bandwidth reliable internet connectivity for receiving images from the camera sources and distributing the images, and possibility of securing long term lease rights just to name a few. These criteria would be developed by an entity installing the arrangement in accordance with the invention or practicing the method in accordance with the invention. Of course, the entity could decide its own selection criteria and the locations may not necessarily be what is typically considered scenic or picturesque.

In another application, restaurants of varying ethnic backgrounds could also employ a streaming view to provide patrons a more immersive dining experience. A French restaurant could utilize a video feed of the Eiffel Tower in Paris or an Italian restaurant could utilize a video feed of the Coliseum in Rome. In this application, the criteria for selecting camera location(s) remain essentially the same, except instead of a high vantage point, a street level view would be more appropriate. Moreover, the restaurant could provide video feeds on different walls of the restaurant that reflect different points of view from the same location, e.g. in Paris close to the Eiffel Tower. Other applications for the invention might require different views as well but the remaining criteria remain essentially unchanged (for example, accessibility, internet availability, long term lease, etc.).

Camera source locations 1, 2, . . . , n might include views of, for example: the Empire State Building in New York City, the Rocky Mountains in Colorado, Big Ben in London, the Eiffel Tower in France and the Piazza del Campidoglio in Italy; these constitute a handful among thousands of potential locations that could be used worldwide. As shown in FIG. 1, streams of images obtained by each of the cameras 12, at source locations 1, 2, . . . , n, would be digitized/compressed locally using an encoder 14 at each source location and transmitted over the internet 18 to an origin server 16. The image streams constitute a streaming video. The encoders 14 shown in FIG. 1 each represent hardware and/or software that is configured and operated to digitize images and effect transmission of the digitized images using appropriate protocol to the origin server 16. The structure and programming of such encoders 14 would be within the purview of one of ordinary skill in the art to which this invention pertains in view of the disclosure of the purpose and functions of the encoders 14 herein. In one embodiment, it is expected that the encoder 14 is coupled to, is integrated with, includes, integrated or incorporates a processor, or other known hardware components, that directs the encoder 14 to perform its desired functions or otherwise coordinates the digitizing/compression and transmission of the videos.

The transmission channels through or by means of which the digitized streaming videos from the encoders 14, i.e., the series of images, are provided to the origin server 16 are represented by 18, which would typically involve a public communications network such as the Internet. These transmission channels 18 may comprise, but are not limited to, wires, wireless transmitters and receivers, communication coupling structure and whatever other hardware and software components are needed to direct the digitized streaming videos from the encoders 14 to the origin server 16. Other comparable transmission systems are encompassed within interpretation of the term transmission channels.

Multiple cameras 12 could be located in the same physical location to provide alternate or even panoramic (360°) views. The cameras 12 could alternatively be panoramic cameras. In a preferred embodiment, each of the cameras 12 would be capable of providing ultra-high definition (UHD, also known as 4K) or better resolution. In an alternate embodiment, high definition (HD, also known as 1080p) cameras could be used. Combinations of these types of cameras or alternative cameras, or more generally, any type of imaging source capable of generating a high quality, transmittable, easily reproducible image may be used in the invention. A camera is a common example of an imaging source.

Each encoder 14 is preferably configured to encode the video consisting of the stream of images via an appropriate standard, for example, the H.264 or VP9 (VP10 currently under development at time of filing) or similar standards. Due to rapidly evolving growth, the invention is not be limited to using these standards and could use newer technologies as they are developed.

A preferred embodiment would implement the encoder 14 in software to allow for future changes in encoding standards, especially since there are no latency concerns.

In an alternate embodiment, encoding could be implemented in hardware but is not confined to do so. It may be possible to configure an encoder with both a set hardware component and an updatable software component, and then configure a computer program to manage updating of the encoder. An encoding system or engine is considered the component that implements the encoding of the video.

Once all camera source streams have been aggregated to the origin server 16, the origin server 16 would publish the stream content to a distribution server 20. There may be a transmission channel 22 between the origin server 16 and the distribution server 20. Transmission channel 22 may comprise, but is not limited to, wires, wireless transmitters and receivers, communication coupling structure and whatever other hardware and software components are needed to direct the digitized streaming videos from the origin server 16 to the distribution server 20. Other comparable transmission systems are encompassed within interpretation of the term transmission channels.

It is possible to co-locate the origin server 16 and the distribution server 20, or integrate these servers into an integral, single server or server unit. A computer program may be resident at the origin server 16 and configured to handle the functions performed by the origin server 16. Also, it should be considered that the origin server 16 may include, be coupled to, be integrated with or incorporate a processor or other hardware that enables its functionality. Otherwise, the origin server 16 may include hardware and software components of commercially available servers, as this term is commonly understood by those skilled in the computer field.

In a similar manner, a computer program may be resident at the distribution server 20 and configured to handle the functions performed by the distribution server 20. Also, it should be considered that the distribution server 20 may include, be coupled to, be integrated with or incorporate a processor or other hardware that enables its functionality. Otherwise, the distribution server 20 may include hardware and software components of commercially available servers, as this term is commonly understood by those skilled in the computer field.

Figure 2:
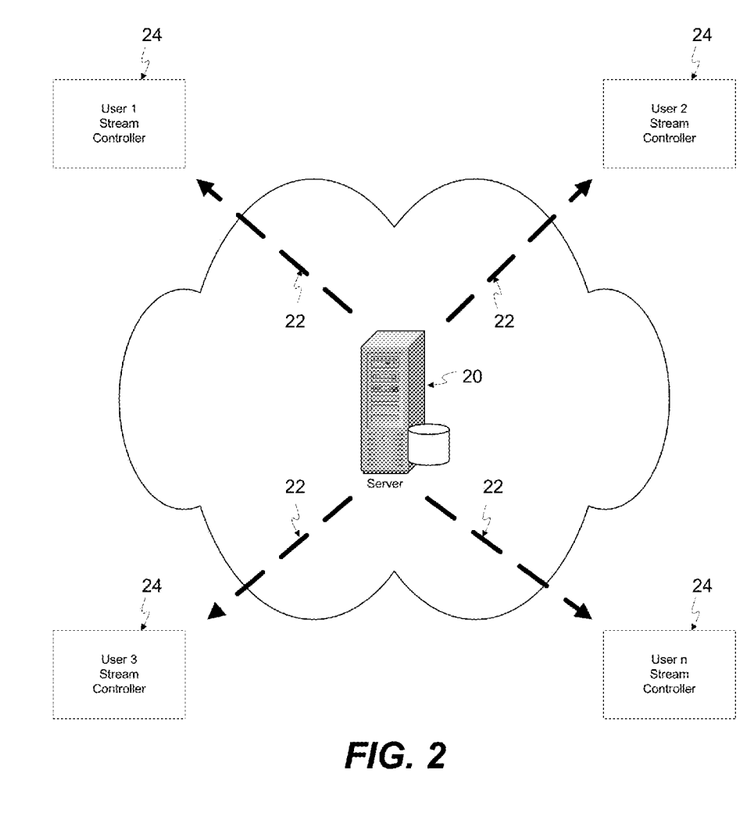
FIG. 2 reflects streaming video distribution using a single distribution server.

The arrangement shown in FIG. 2 reflects streaming video distribution using a single distribution server 20 of FIG. 1. In this instance, the streaming view from one or more of the cameras 12 is distributed using a multicast protocol to each user subscribing to the service, i.e., user 1, user 2, user 3, user n. Distribution server 20 would be capable of storing a minimum number of hours of video from the plurality of cameras 12, e.g., 24 hours of videos from each camera 12, in one or more memory components associated with the distribution server 20.

A stream or streaming controller 24 may reside and/or be under the control of each user at each user site to enable each user to select the streaming videos that they want to view, i.e., select the imaging location they want to view or the imaging source, camera 12 which provides a view of that location and the starting time or time range of the video from the selected location or camera 12. The user would be provided with a list of the available locations or imaging sources and times at which streamlining videos have been or are ongoing around the clock, e.g., on a display with a menu or listing of this information. This information may also be searchable by a search engine functionality implemented in the stream controller 24.

Figure 3:
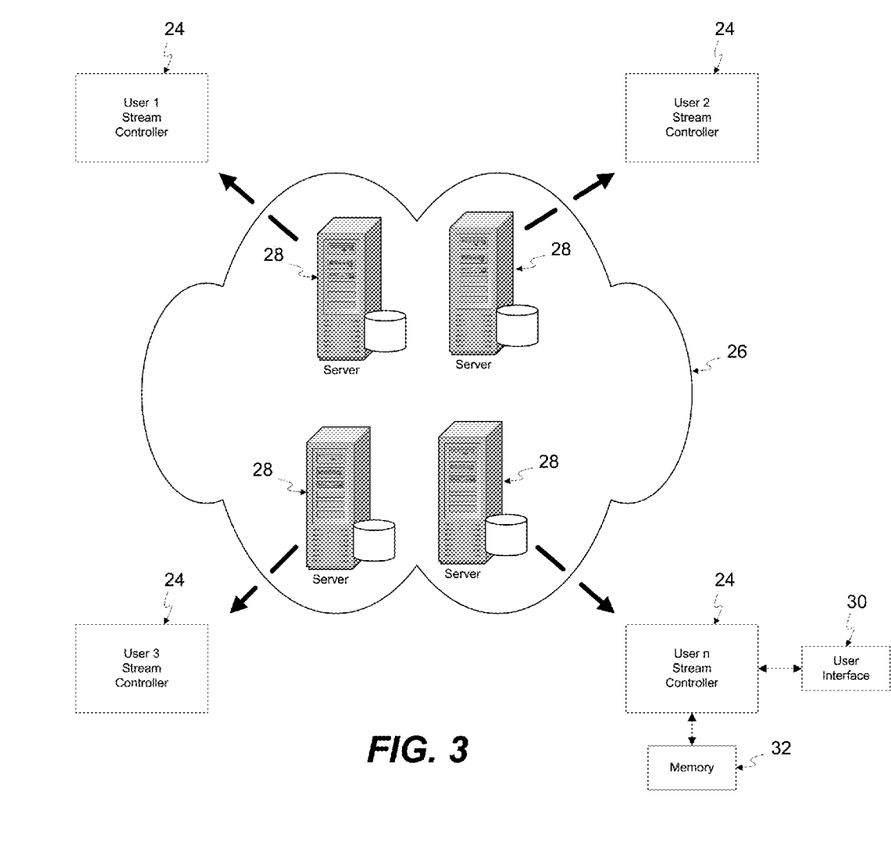
FIG. 3 reflects streaming video distribution using a content delivery network (CDN) comprising a plurality of distribution servers.

An alternate embodiment shown in FIG. 3 employs a content delivery network 26 (CDN) instead of a single distribution server for stream distribution. A plurality of distribution servers 28 within a CDN 26 is often geographically diverse in theft location. Each distribution server 28 would be connected to the origin server 20 via a transmission channel 22 (as described above) and receive the video streams therefrom upon demand by the user-controlled stream controllers 24. A computer program may be resident at each distribution server 28 and configured to handle the functions performed by the distribution server 28. Also, it should be considered that the distribution server 28 may include, be coupled to, be integrated with or incorporate a processor or other hardware that enables its functionality. Otherwise, the distribution server 28 may include hardware and software components of commercially available servers.

The subscriber would typically stream video content from one of the distribution servers 28 that is closest to them, which is called an edge server. This avoids any delays that might be caused due to server proximity, but more importantly helps to avoid network congestion issues.

Each subscriber or user would stream video of the scenic view using any one of a number of streaming protocols: MPEG-DASH, RTMP, RTCP, RTP, HDS, HLS, Smooth Streaming, etc. In a preferred embodiment, the streaming protocol adopted would employ adaptive bitrate streaming to reduce the required bandwidth. It is anticipated that ultra-high definition streams would require 9 Mbit/s and high definition streams would require 5 Mbit/s of the user subscriber internet bandwidth.

On the user subscriber (client) side, the streamed content from the distribution server 20, 28 is fed into the stream controller 24 in a housing. The stream controller 24 connects to the Ethernet via either wired or wireless means and would likely utilize a real time operating system (RTAS). The stream controller 24 may be controlled via a dedicated handheld remote control through infrared (IR), radio frequency (RF), Bluetooth® or similar wireless hardware, home automation network or through a tablet/smart phone/laptop app interface. Generally, such a control system is referred to as a remote control unit. The user subscriber would enter basic information (such as account info, zip code, etc.) into the stream controller 24 using one or more user interfaces 30 coupled to or integrated into the stream controller 24 as well as selecting scenic view preferences using the same user interface(s) 30. Integration of a user interface 30 into the stream controller 24 may involve use of the screen on which the video stream will be displayed and a remote controller, the combination of which used as a user interface is known to those skilled in the art to which this invention pertains.

While GPS circuitry could be included within the stream controller 24 to automate part of this process, the added hardware expense is not justified since the setup is typically done only once for a particular user subscriber premise and would not be particularly burdensome. Using the geographic location and the Ethernet connection, and optional user input, the stream controller 24 can determine or be provided with the appropriate local time zone, whether daylight savings applies and synchronize local time with a Network Time Protocol (NTP) time server. By having a synchronized time of the user subscriber's location, a time-shifted stream of whatever scenic view is selected would be possible.

Since all camera source geographic locations are known and preferably fixed (immovable for the duration of application by and use in accordance with the invention), the time delta or differential between each camera source and the local time at a location of a user subscriber requesting streaming video can be easily calculated so that the user subscriber could be viewing a scenic sunrise from halfway around the world at the time of the local sunrise even though the scenic sunrise occurred hours earlier. Viewing selection preferences of the stream controller 24 might include such items as: primary view, secondary (fallback) view, randomized view, real time display, shifted display, etc. An optional power saving mode is integrated into the computer program at the stream controller 24 whose execution controls operation of the stream controller 24 and may allow the stream controller 24 to automatically turn on/off at user-scheduled times so that internet bandwidth and power use is limited.

Each stream controller 24 would preferably include at least one 24 hour loop of a stored scenic (default) view, e.g., stored in one or more memory components 32 associated with or part of the stream controller 24. Each stream controller 24 would also preferably contain sufficient memory in the memory component 32 to allow storage/buffering of a minimum of 24 hours of a streamed scenic view.

In the event a camera 12 or its encoder 14 loses power, or for some reason internet connectivity is lost, the stream controller 24 can continue to stream the selected time-shifted view until the buffer/memory in the memory component 32 is depleted, switch to a secondary view or revert to the internal stored default view(s). This can be achieved by design of the computer program at the stream controller 24.

Figure 4:
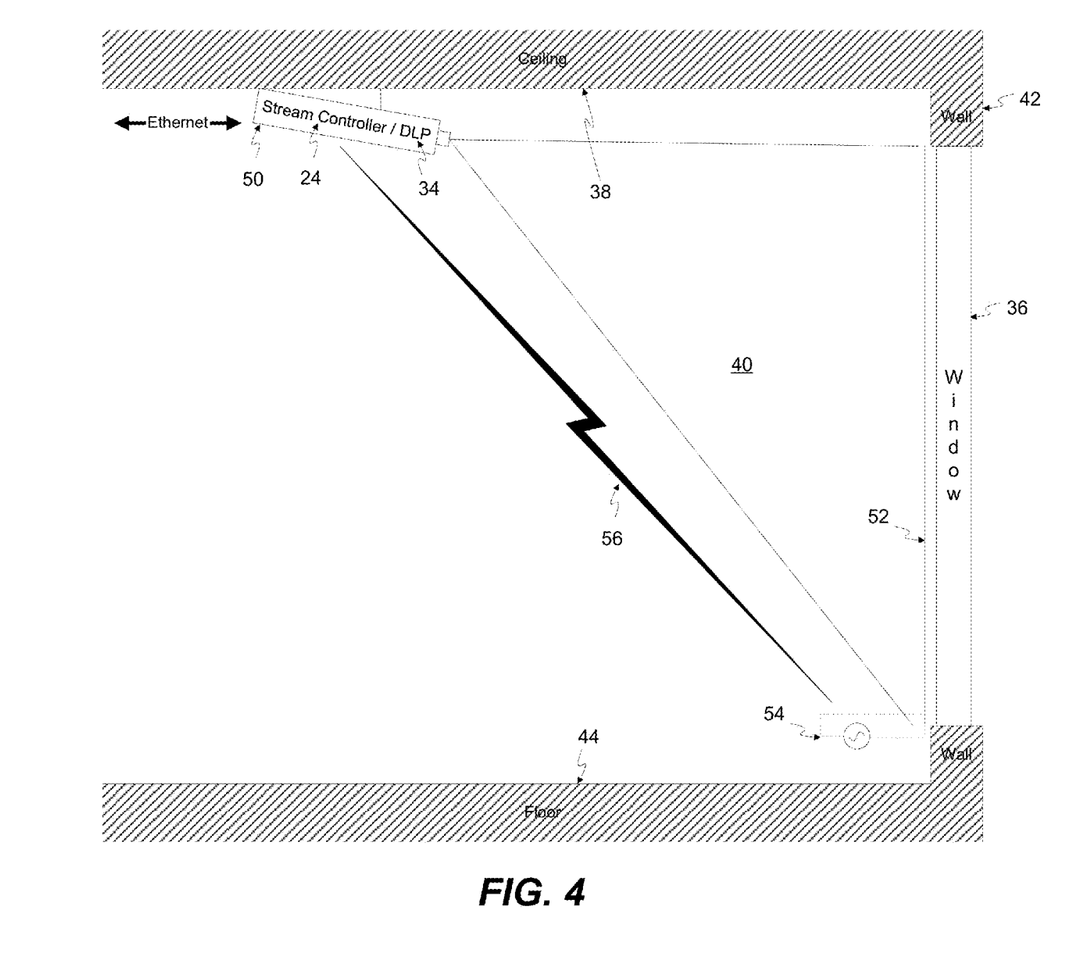
FIG. 4 depicts a stream controller using a digital light projector (DLP) of a display system for displaying videos.

Incorporating display of the scenic streamed views can be accomplished in a number of ways for interior architectural design. As shown in FIG. 4, the stream controller 24 could be incorporated to use a digital light projector (DLP) 34. In a preferred embodiment, the DLP 34 would be capable of 4K resolution, for example. The DLP 34 could combine the stream controller 24 within the same enclosure or housing 50. The housing 50 may be mounted to a ceiling 38 of the interior space 40 using any known mounting hardware (not shown). A floor 44 also defines the interior space 40 with a wall 42.

The DLP 34 would project the scenic view upon, for example, an exterior window 36 in the wall 42 to simulate a true view. The window 36 would be equipped with a means to block the outside view and in a preferred embodiment, smart glass (also known as privacy glass) could be used. For new installations, smart glass could be installed directly; for existing installations or renovations, this capability can be added as a film 52 to the inside of the existing window. Existing smart glass typically uses a polymer dispersed liquid crystal (PDLC) or similar technology. In the same or a similar manner that Transitions® eyeglass lenses are photochromic (change when exposed to UV light), polymer dispersed liquid crystal windows/films are electrochromic (change when exposed to electric current). The window 36 would thus be opaque without power from a power supply 54 applied, transparent (clear) when AC power is applied and 'dimmable' between the full opaque/transparent states. The glass/film consumes roughly 0.25-1.0 watts per sq. ft. and is available in sizes that exceed 60 sq. ft. A cheaper competing technology currently under development at time of filing utilizes an elastomer rubber coated with nanowires to scatter light.

The smart glass would be under the control of the stream controller 24 through IR, RF, Bluetooth® or similar wireless hardware, which wireless control component is represented as 56, to act seamlessly in unison with each other.

In an alternate embodiment, 'between the glass blinds' could be used to block the outside view or be used in conjunction with smart glass as a means for blocking/reducing light through the window glass.

Incorporating the actual window as the display surface has the added benefits of privacy, UV protection and heating/cooling cost savings, among others. The 'window' 36 need not be an exterior window at all and could be a section of smart glass mounted on an interior wall. This glass could be used to protect items of value; i.e. a cubbyhole behind of the glass that is used to display sports a memorabilia or similar collection when the view is not in use.

Figure 5:
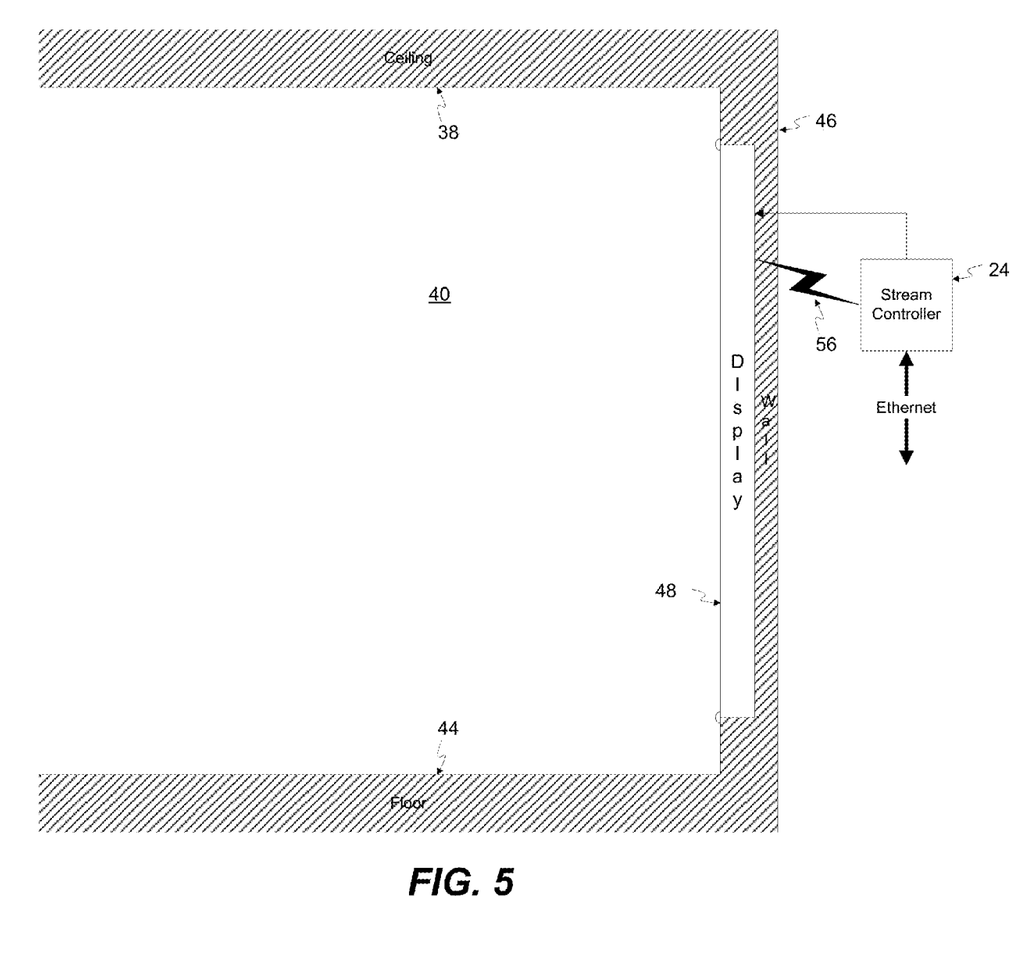
FIG. 5 depicts a stream controller using a fixed display of a display system for displaying videos.

Interior walls 46 could use a direct LCD/LED or similar panel display 48 as shown in FIG. 5. In this embodiment, the display panel 48 would also be under the control of the stream controller 24 through IR, RF, Bluetooth® or similar wireless control hardware 56 to act seamlessly in unison with each other. Since there are practical size limitations to such display panels 48, a larger effective panel size could be composed of multiple displays laid out in a grid fashion with molding between the displays to create a mullioned effect found in traditional style windows.

The DLP 34 in FIG. 4 in combination with the window 36, and the display panel(s) 48 in FIG. 5 each represent a display system configured to display the videos to a user.

An advantage of the invention is that an occupant of a residential unit (apartment, condominium, townhouse, etc.) in a high rise buildings on a low floor or facing in a less desirable direction, can display on their windows a view from a higher floor and/or facing in a more desirable direction. The occupant can install a display panel 48 in a wall 46 of their residence and without using a time differential scheme, display a video of what the view is from the same building but taken by a camera positioned on a higher floor and facing in a more desirable direction. An occupant in a residence facing west could therefore display sunrise from the east on their display panel 48 at the time of the sunrise, which is visible from east-facing residences in the same building. Similarly, an occupant in a residence facing east could display sunset from the west on their display panel 48 at the time of the sunset, which is visible from west-facing residences in the same building.

This time differential may be determined by a processor at the stream controller 24, and it should be considered that the stream controller 24 includes or incorporates a processor, which may be considered a streaming engine. This processor thus determines a time differential between imaging local time at which one of the videos was imaged and local time at location of one of the stream controllers 24. The streaming video can be time-delayed based on the determined time differential to enable display of a video imaged at the imaging local time at the local time at location of the stream controller 24.

An occupant of a lower floor in a building could immerse themselves in a virtual reality of living on a higher floor of the same building by streaming a real-time video of the appearance of the environment taken from a camera on the higher floor of the same building. This video could be displayed by the display system. e.g., DLP 34 and window 36 or display panel 48, at the same time as the video was taken. If there is a time differential, i.e., the user wants to stream video from a more eastern time zone, the time at which a video is taken may be included in the information about the video and used to enable user to determine when they want to view that video relative to their local time. This could be automated to enable the user to determine the imaging source and the stream controller 24, working in conjunction with the distribution server 20, 28, would provide time-correct streaming video.

By time-correct, it is meant that the user views video at the local time which is the same as the time that the video was obtained by the imaging source. As an example, if the user lives in Los Angeles and they want to see the sunrise over Maine (approximately a 3 hour time differential), they can control their stream controller 24 to obtain streaming video from an imaging source located on the coast of Maine. However, the streaming is not real-time, but rather, the user will view at 6 AM Los Angeles time the videos obtained at 6 AM Maine time. This time delay can be effected by the computer program at the stream controller 24 once it knows the local time and the time at the imaging source from which the user wants to obtain streaming video. It can also be effected by the distribution server 20, 28.

Figure 6:
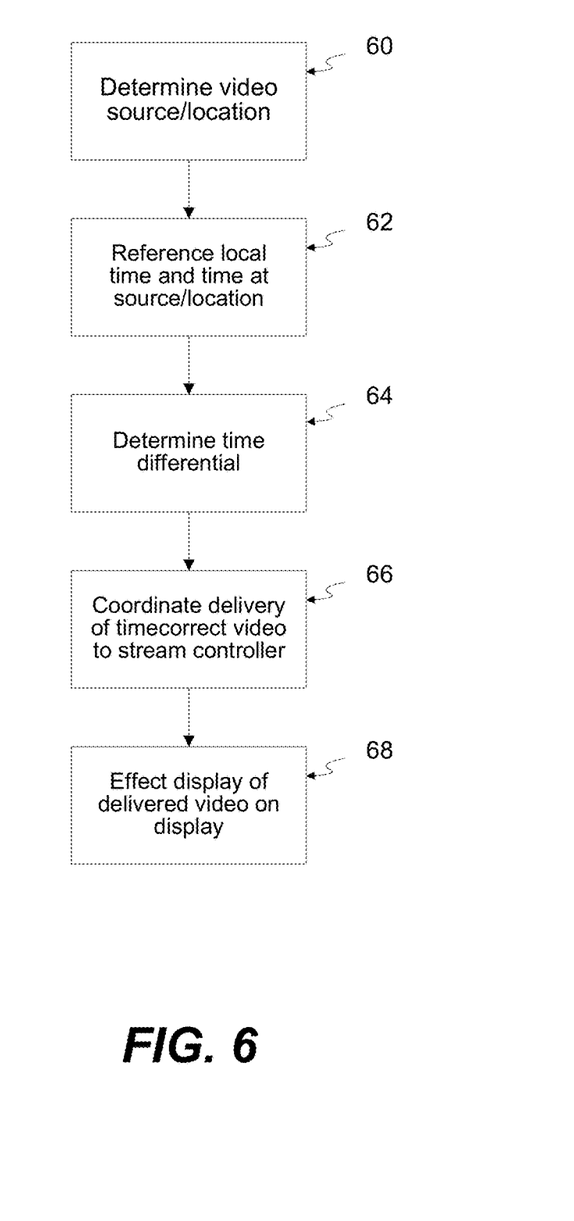
FIG. 6 is a flow chart explaining the manner in which time-delayed video streaming may be implemented in the invention.

This time delay streaming is explained with reference to FIG. 6, a flow chart of the manner in which a time delayed streaming is implemented. In the first step 60, the user determines the camera location or video source, i.e., what they want to view. This may be achieved by the user interacting with the stream controller 24 using a wireless control component 56 and/or a user interface 30. In step 62, the local time and time at the determined video originating source/location is obtained or determined. This step may involve input from the user as to the local time, either concurrently with instant desire for video streaming or previously using the user interface 30, or may be automatic if the stream controller 24 is connected to the internet. The stream controller 24 also obtains the time at the determined source/location from the origin server 16 since such information would typically by associated with the video streaming feeds being provided by the cameras 12 at the source locations.

In step 64, the processor at the stream controller 24 determines the time differential. This time differential may be an exact measure of the time relative to an event, e.g., relative to sunrise or sunset. Sunrise and sunset have variable times within the same time zone, so the time differential may not necessarily be units of whole hours, but may be, for example, 1 hour 24 minutes and 3 seconds, between the local time at the user's location and the local time at the camera source/location when considered relative to sunrise. That is, sunrise where the user is will be 1 hour 24 minutes and 3 seconds after sunrise at the location of the camera 12.

Once the time differential is determined in step 64, the processor at the stream controller 24, at the origin server 16 or at the distribution server 20, 28, coordinates reception of the appropriate streaming video at the stream controller 24 in step 66. This coordination facilitates delivery of the time correct streaming video to the user so that they can, in step 68, view the sunrise from the Eiffel Tower at the moment of sunrise where they are located on a display, e.g., a window or dedicated video/image display unit.

As mentioned above, a computer program would be provided in the stream controller 24, and such a computer program would effect the steps 60-68 to allow for the time-delayed streaming of videos. This computer program would also be configured to interact with the origin server 16, the distribution servers 20, 28 and the display system, i.e., the DLP 34 in FIG. 4 in combination with the window 36 or the display panel(s) 48 in FIG. 5. Such interaction would provide operability for the invention, and may be present in embodiments wherein the time delay is not used.

A paid subscription service may be created by aggregating the feeds from the cameras 12 from scenic locations around the world. The subscription service would be in the form of a computer program or "app" that can be downloaded to or otherwise installed in stream controllers 24, A user (subscriber) would pay the subscription fee and then would be provided with access to the server 20, 28 to enable them to select whatever imaging sources they want to receive streaming videos from and be provided with access to them for streaming via the server 20, 28. The subscription service may be a flat monthly fee or a per-video fee. Thus, if the user wants only to stream from one imaging source, they would only pay for that streaming video. On the other hand, if they want a variety of imaging sources throughout the world say, they could opt for the monthly subscription or pay for each individually. Pricing could be variable.

The app would be programmed to check that the user is current with their subscription and if not, offer the opportunity to pay to join or renew the subscription. A subscribing user may be provided with a usual security protocol to ensure their subscription is not misused by others.

A fee payment platform would be integrated into the computer program and direct the fees paid to an operator of the server 20, 28. Other usual and customary features of a paid content subscription service could also be incorporated into the paid streaming video subscription services of the present invention.

There are virtually no limitations to the invention. Users in northern climates could view atmospheric events, e.g., sunrise and sunset, from warmer climates, and vice versa. Moreover, in extreme northern or southern climates at times where there is no sunrise or sunset, the users could program their stream controllers 24 to display sunrise or sunset at desired or expected times to enable them to maintain regularity with their daily routine. This embodiment would provide significant advantages in that users could structure their day about artificial sunrise and sunset and avoid detrimental effects caused by living in continuous daylight during summer months and continuous darkness during winter months, or vice versa.

Variations to the invention are possible. For example, it is contemplated that streaming videos may not necessarily be of scenic views, and may be of ordinary street views. It is also possible that a user can suggest locations for camera 12 placement, preferably subject to the location providing videos that might be sought for viewing by others since the invention is not intended to be a personal service for streaming videos.

The invention represents a time-displacement transformation of individual images or a stream of images, e.g., a video, from one vantage or imaging point to another display point via reduction of the image or images to a data file and reproduction of the image or images from the data file at a later time and/or at a different viewing location. As mentioned above, the transformation may be live streaming if the vantage point and display point are in the same building but facing different directions. Thus, the images may be transformed into data and immediately reproduced in the same building from an eastern facing imaging location to a residence on the western side of the building so that the occupant of the residence on the western side can view the sunrise at the correct time. Coordination of the imaging at the vantage or imaging points relative to the display or reproduction at the display points forms the basis of the invention, e.g., selection of the vantage points, managing the time differentials, and the like as explained above. These steps may be performed by a processor and associated hardware and software as described above.

The computer program resident at the stream controllers 24, and other computer programs resident at, for example, the cameras 12, servers 20, 28, may be resident on or include transitory or non-transitory computer-readable media and their function and non-limiting location are mentioned above. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, portable compact disk read-only memory (CDROM) and a digital versatile disk read-only memory (DVDROM).

The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having thus described a few particular embodiments of the invention, various alterations, modifications, and improvements will readily occur to those skilled in the art. For example, structural components of the prior art systems described above may be incorporated into the systems in accordance with the invention, and their functionality incorporated into methods and computer programs in accordance with the invention, and such incorporations are considered to be part of the disclosed invention. Moreover, any of the features disclosed above with respect to one embodiment is not limited to use in that embodiment and may be used in any of the embodiments disclosed herein. This means that the inventors envision a system and method including all or any subset of the features of the embodiments disclosed herein. Alterations, modifications and improvements as are made obvious by this disclosure are also intended to be part of this description though not expressly stated herein, and are intended to be within the spirit and scope of the invention. Accordingly, the foregoing description is by way of example only, and is not limiting. The invention is limited only as defined in the claims and equivalents thereto.

The invention claimed is:

1. A system, comprising:
   at least one server each coupled to a plurality of imaging sources that obtain high resolution videos of scenic views at different geographic locations, each obtained video being associated with a time and location indication;
   a plurality of stream controllers each located at a user site and coupled to said at least one server;
   a respective user interface configured to enable control of each of said stream controllers to enable selection of one of the imaging sources based on time and location to provide streaming video from the selected one of the imaging sources taken at the selected time to said stream controller via said at least one server;
   a respective display system coupled to each of said stream controllers and configured to display streaming video from the selected one of the imaging sources; and
   a video memory component associated with each of said stream controllers and configured to store a minimum of a 24 hour loop of the streaming video, whereby the stored loop is provided to said display system when said stream controller is unable to communicate with said at least one server to retrieve streaming videos from said at least one server.

2. The system of claim 1, wherein said at least one server consists of a single origin server that aggregates the videos from the imaging sources and a single distribution server coupled to said origin server and that distributes the streaming video to said plurality of stream controllers.

3. The system of claim 1, wherein said at least one server comprises a single origin server that aggregates the videos from the imaging sources and a plurality of distribution servers that form a content delivery network and distribute the streaming video to said plurality of stream controllers.

4. The system of claim 1, wherein said respective display system comprises a high resolution digital light projector configured to project the streaming video onto a screen of said display system.

5. The system of claim 4, wherein said respective display system further comprises smart glass that provides said screen of said display system.

6. The system of claim 1, wherein said respective display system comprises a high resolution panel display.

7. The system of claim 1, wherein each of said video memory components is further configured to buffer a minimum of 24 hours of the streaming video.

8. The system of claim 1, wherein said respective user interface is further configured to enable control of one of said stream controllers to determine a time differential between imaging local time at which one of the videos was obtained and local time at location of said stream controller and select one or more of the streaming videos to be retrieved by said stream controller from said server based on the determined time differential to enable display of a streaming video imaged at the imaging local time at the local time at location of said stream controller.

9. The system of claim 1, wherein said stream controller is configured to select another one of the imaging sources to provide streaming video to said stream controller via said at least one server when streaming from the selected one of the imaging sources is interrupted.

10. The system of claim 1, further comprising a respective remote control unit configured to control each of said stream controllers using a dedicated IR/RF channel, short range wireless connection protocol or wireless hardware.

11. A selective display method, comprising:
    obtaining high resolution videos of scenic views at different geographic locations from imaging sources imaging the locations;
    associating, using a processor, the obtained videos with time and location indications;
    coupling at least one server to the imaging sources;
    distributing the videos to a plurality of stream controllers each located at a user site and coupled to the at least one server, each stream controller being controlled to select one of the imaging sources based on location and time to provide streaming video from the selected one of the imaging sources taken at the selected time to the stream controller via the at least one server for display; and
    storing a minimum of a 24 hour loop of a high resolution video from one of the imaging sources at a video memory component associated with one of the stream controllers,
    whereby the stored loop of at least one high resolution video from the imaging source is displayed when the stream controller is unable to communicate with the at least one server to retrieve high resolution videos from the at least one server.

12. The method of claim 11, wherein the at least one server consists of a single origin server that aggregates the videos from the imaging sources and a single distribution server coupled to the origin server and that distributes the streaming video to the plurality of stream controllers.

13. The method of claim 11, wherein the at least one server comprises a single origin server that aggregates the videos from the imaging sources and a plurality of distribution servers that form a content delivery network and distribute the streaming video to the plurality of stream controllers.

14. The method of claim 11, further comprising:
coupling at least one of the stream controllers to a digital light projector;
positioning a display window in a projection path of the digital light projector; and
controlling the digital light projector to display the streaming video from the selected one of the imaging sources on the display window.

15. The method of claim 14, wherein the display window is integrated into a window of a residence.

16. The method of claim 11, further comprising coupling a display panel to one of the stream controllers and displaying the streaming video from the selected one of the imaging sources on the display panel.

17. The method of claim 11, further comprising determining a time differential between imaging local time at which one of the videos was imaged and local time at location of one of the stream controllers using a processor and displaying the streaming video from the selected one of the imaging sources with a time delay based on the determined time differential to enable display of a streaming video imaged at the imaging local time at the local time at location of the stream controller.

18. A system, comprising:
a plurality of imaging sources each imaging a scenic view at different geographic locations in high resolution;
at least one server each coupled to said imaging sources and receiving videos from said imaging sources, each received video being associated with a time and location indication;
a plurality of stream controllers each located at a user site and coupled to said at least one server;
a respective user interface configured to enable control of each of said stream controllers to enable selection of one of the imaging sources based on time and location to provide streaming video to said stream controller via said at least one server;
a display screen;
at least one high resolution digital light projector located in a common housing with a respective one of said stream controllers, each of said at least one digital light projector being configured to project the streaming video from the selected one of the imaging sources onto said display screen to cause display the streaming video from the selected one of the imaging sources; and
a video memory component associated with each of said stream controllers and configured to store a minimum of a 24 hour loop of the streaming video,
whereby the stored loop is provided to said at least one digital light projector when said stream controller is unable to communicate with said at least one server to retrieve streaming videos from said at least one server.

* * * * *